United States Patent
Boudier et al.

(10) Patent No.: US 6,542,479 B1
(45) Date of Patent: Apr. 1, 2003

(54) TELECOMMUNICATIONS SYSTEM AND A MULTIBEAM SATELLITE USABLE IN SUCH A SYSTEM

(75) Inventors: Nicolas Boudier, Castanet-Tolosan (FR); Eric Alberty, Fonsegrives (FR); Laurent Thomasson, Toulouse (FR)

(73) Assignee: Matra Marconi Space France, Paris (FR)

( * ) Notice: Subject to any disclaimer, the term of this patent is extended or adjusted under 35 U.S.C. 154(b) by 0 days.

(21) Appl. No.: 09/457,323

(22) Filed: Dec. 9, 1999

(30) Foreign Application Priority Data

Dec. 11, 1998 (FR) .............................................. 98 15708

(51) Int. Cl.$^7$ ......................... H04B 7/204; H04B 7/185
(52) U.S. Cl. ...................................... 370/319; 455/12.1
(58) Field of Search .............................. 370/310, 316, 370/319, 321, 326; 455/12.1, 427

(56) References Cited

U.S. PATENT DOCUMENTS

| 4,425,639 A | | 1/1984 | Acampora et al. | |
| 4,722,083 A | | 1/1988 | Tirró et al. | |
| 5,555,257 A | * | 9/1996 | Dent | 455/63 |
| 5,835,487 A | * | 11/1998 | Campanella | 370/316 |
| 5,943,324 A | * | 8/1999 | Ramesh et al. | 370/321 |

* cited by examiner

*Primary Examiner*—Nguyen T. Vo
(74) *Attorney, Agent, or Firm*—Larson & Taylor, PLC

(57) ABSTRACT

A telecommunication system has a space segment which includes a satellite carrying a multibeam telecommunications payload and a terrestrial segment comprising gateways for access to a terrestrial network. There is one gateway within a terrestrial coverage of each beam or of a group of beams. User terminals communicate with the payload of the satellite. The payload has, on a forward path from any gateway to any user terminal, a frame by frame routing unit for messages transmitted in time division multiplex. On a return path from a user terminal to a gateway the payload has a routing unit operating within each group of carriers belonging to a given beam.

12 Claims, 4 Drawing Sheets

TELECOMMUNICATIONS SYSTEM AND A MULTIBEAM SATELLITE USABLE IN SUCH A SYSTEM

BACKGROUND OF THE INVENTION

The present invention relates to geostationary satellite telecommunications systems enabling information to be interchanged between terrestrial terminal (user terminals, servers, etc.) having a very wide variety of requirements concerning bandwidth and transmission delays.

More particularly, the invention relates to systems using one or more satellites having several tens of beams (generally 20 to 60), with it being possible for the number of beams to be different on up links and on down links. Such a system is in use in particular for providing telecommunications in Europe, with forty beams, each having an aperture of about 0.6°.

An attractive architecture consists in mounting a payload on the satellite for providing full connectivity and flexibility and also for regenerating messages.

Connectivity makes it possible to route traffic other than local traffic (i.e. between two terminals placed in the same beam) from one beam to another. It requires routing apparatus to be present on the satellite to send calls directly to the beam in which the receive terminal is to be found, and minimizes the use of terrestrial networks, which are particularly expensive for connections in connected mode.

Flexibility is constituted by the ability of the payload to interchange bandwidth and thus capacity between beams on the up link and/or down link.

A solution which appeared the most appropriate for providing high quality communication and for satisfying the above conditions consists in adopting an asynchronous transmission protocol (ATM) and in providing a payload on the satellite for full regeneration both on the forward link (from ground gateways for providing a connection from the terrestrial network to user terminals) and on the return link (from user terminals). However that approach makes it necessary to have a payload that is complex and not sufficiently mature, in particular because of the requirement for ATM switches to have memory of a type that is not available for satellite installation at present.

Another solution consists in providing the payload in such a manner that it uses the same beams for the up and down paths of a connection. It is based on the assumption that local traffic (within a single beam) between direct users and without intervention of a terrestrial segment is preponderant.

SUMMARY OF THE INVENTION

It is an object of the invention to provide a system that constitutes a satisfactory compromise between satellite payload complexity and reducing the use of terrestrial networks, i.e. seeking a minimum routing cost. An ancillary object is to provide a system terminals can be provided which, from the beginning, are suitable for subsequent use in a system having complete connectivity and flexibility with memory ATM switches on board the satellite.

To this end, the invention provides a system comprising a space segment having at least one satellite carrying a multibeam telecommunications payload, and a terrestrial segment comprising gateways giving access to the terrestrial network and that are distributed at a density of one gateway within the coverage of each beam or group of beams, and user terminals provided with means for radiocommunication with the payload of the satellite.

The payload comprises:
on a forward path from a gateway to a user terminal, a frame by frame routing unit for messages transmitted in time division multiplex (TDM); and
on a return path from a user terminal to a gateway, a routing unit operating within each group of carriers belonging to a given beam (the group of a beam possibly having only one carrier, but generally having at least five carriers in a commercial system).

The two routing units can be merged in the form of a common processor or they can belong to processors that are separate. A portion of the transmission capacity can be "frozen" and reserved for local calls, i.e. calls within a given beam, whenever the quantity of local traffic justifies this approach. This reduces the mass of the payload and the power it consumes.

In a system of the above type, the return path is transparent (or in other words non-regenerative). In particular, it can make use of a mode of multiple access transmission relying on carrier frequency division with, for each carrier, each message being shared over time slots of the same rank in successive frames (F/TDMA mode). The absence of message regeneration on board the satellite makes the system open to future evolution and to new standards. It can be compensated by increasing the equivalent isotropic radiated power of the radio portions of the terminals.

In contrast, the forward path can be regenerative. In general, it will use a mode of transmission by time division multiplexing (TDM) with successive frames being carried without interruption and grouped together as superframes.

Under such circumstances, the satellite payload is designed to perform in succession, on the forward path, demodulation, switching, and remodulation. The switch can be of simple type serving merely to provide interconnections. In a solution that is more complex, the switch can have a TDM frame storage memory. It is then possible to send the data packets of the incoming frames to any outgoing modulator by modifying the order of succession of the packets.

The granularity of the system (defining its ability to subdivide the passband into fractions of greater or lesser size) can be high. On the forward link, it can be about 1.5 Mbps by virtue of the frame-by-frame switching. On the return path granularity can be about 5 MHz and can correspond to a data rate of 6×384 kbps under normal conditions.

The invention also provides a satellite suitable for use in a telecommunications system having a terrestrial segment with, gateways giving access to the terrestrial network, the satellite comprising:
on a forward path, a member for routing transmitted messages frame by frame in time division multiplex (TDM), and message-regeneration means; and
on a return path, a transparent routing member operating in F/DTMA mode within each group of carriers belonging to a given beam.

The above characteristics and others will appear more clearly on reading the following description of a particular embodiment, given by way or non-limiting example. The description refers to the accompanying drawings.

DETAILED DESCRIPTION

Figure 1:
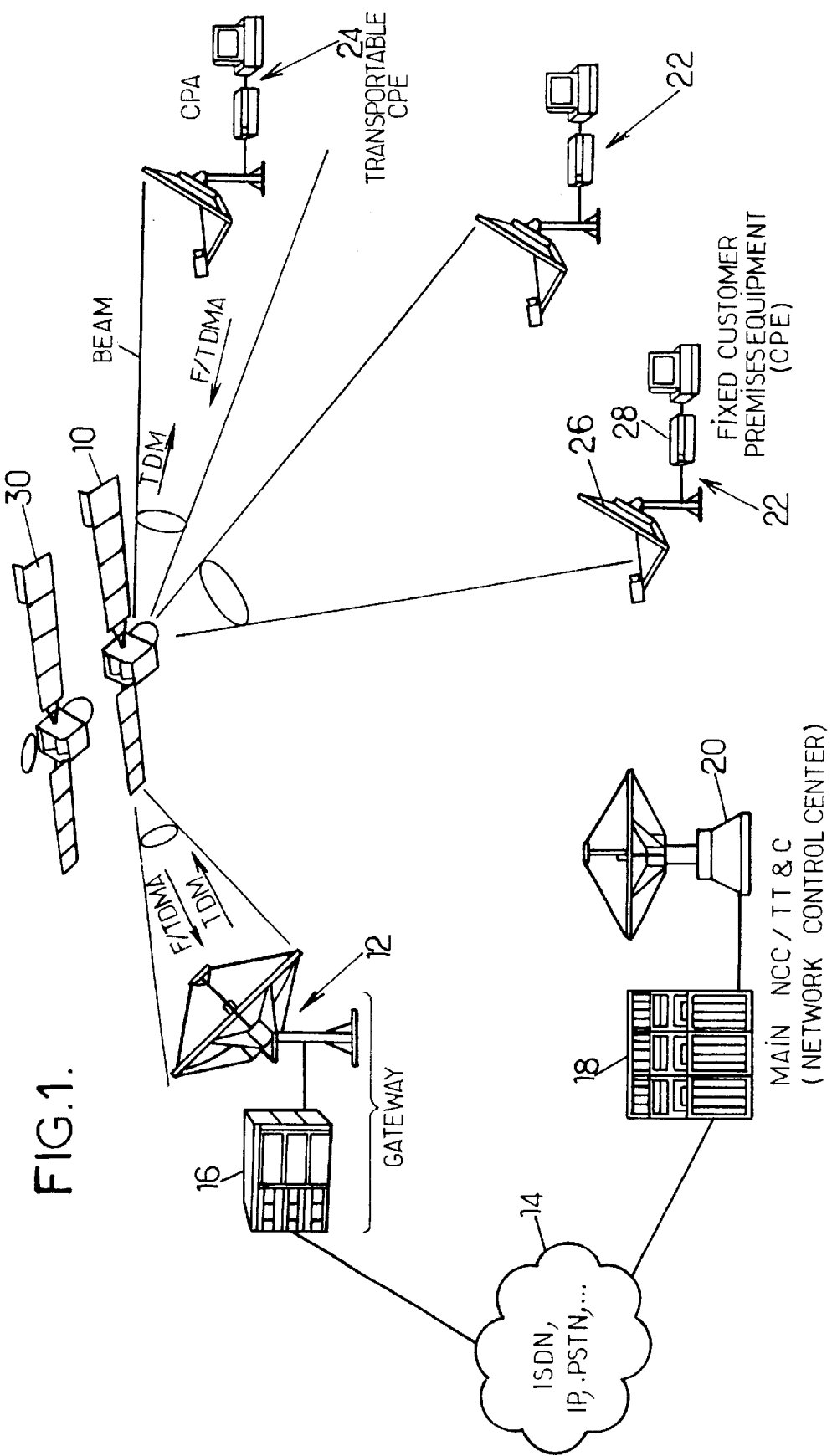
FIG. 1 shows a general architecture of a system, with only some of the terminals being shown.

The architecture of which only some elements are shown in FIG. 1 comprises at least one multibeam satellite 10 placed on a geostationary orbit. In the coverage of each beam there is placed at least one terrestrial gateway 12 giving access to a terrestrial network 14. This gateway incorporates a switch 16 and means for radiocommunication with the satellite, e.g. using quadrature phase shift keying (QPSK). In general, only one gateway is used per beam in order to simplify the necessary synchronization operations. Nevertheless, a plurality of gateways could be distributed.

The network 14 to which access is given via the gateways is connected to a network control center 18. The control renter controls the pseudostatic configuration of the physical forward and return paths, responsive to traffic requirement forecasts or to real demand. It also incorporates means for centralized management of the network.

The gateways manage resources from a connection point of view. Physical resources are allocated to them by the center 18. The function of the gateways includes, in particular, managing multiple accesses, signaling functions, and node functions for traffic to and from terminals connected to the network.

The network is also connected to a station 20 for remotely controlling the satellite, for the purpose of configuring and monitoring the payload of the satellite.

Finally, the terrestrial segment of the network can be connected to fixed user terminals 22 and to transportable user terminals 24 which can be of various types as to their bandwidth requirements, and which generally have an outside portion 26 and an inside portion 28.

When justified by traffic requirements, a second satellite 30 can be put in the same location as the satellite 10 on the geostationary orbit. The second satellite can be designed to provide connections solely between two terminals and/or gateways that are within a same beam. The system can evolve. The "transparent" satellite which requires heavy use of terrestrial resources is launched first. Subsequently, a satellite having routing ability is put on station close to the first satellite and co-operates therewith.

As mentioned above, the return connection from a user terminal 22 or 24 to a satellite and from the satellite on to a gateway takes place in F/TDMA mode, while connections to user terminals take place in wideband TDM, shared between all of the user terminals situated in a single beam. A user terminal accesses the satellite to send requests, which in general amounts to a requirement that is much smaller than that for return information. The satellite acts as an interconnection switch and routes F/TDMA carriers transparently to the destination gateway on the return path and it routes broadband TDM messages frame by frame from the various gateways to the destination beams. With present technology, there is no difficulty in adopting a data rate of n×384 kbps (n being an integer greater than 1) for requests coming from a user terminal and a data rate of about 100 Mbps for TDM transmission to users.

Figure 2:
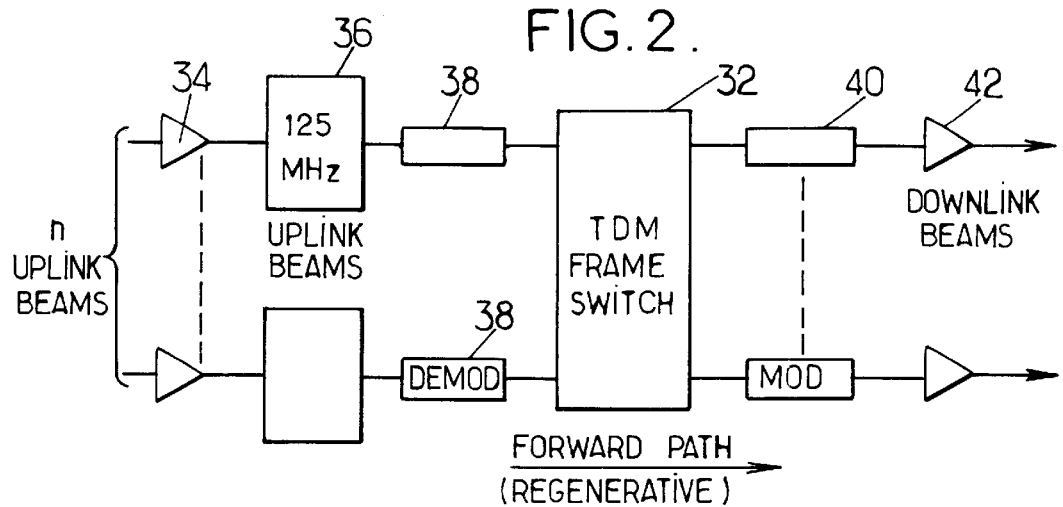
FIGS. 2 and 3 are block diagrams showing the operations performed on the forward and return links on board the space segment of the system.
Figure 3:
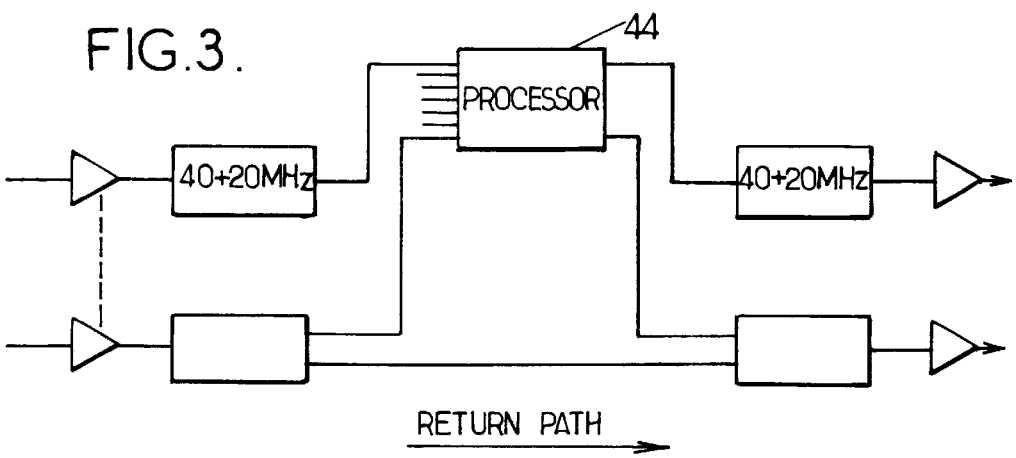

The processing performed by the payload of the satellite on the forward and return paths is shown diagrammatically in FIGS. 2 and 3 respectively.

In FIG. 2, the switch 32 situated on the forward path has the same number n of inlets and of outlets. Calls received on a beam are applied to an amplifier 34 followed by a bandpass filter 36 and a demodulator 38. The switch operates at frame level and applies frames to the appropriate outlet beam. Each outlet message is remodulated at 40 and amplified at 42.

In a particular embodiment, the n inlets are subdivided into two subgroups, and each signal has a bandwidth of 125 MHz. To ensure satisfactory transmission quality, the TDM signals are advantageously subjected to convolutional encoding and are decoded by a maximum likelihood algorithm.

Under such circumstances, the switch is incorporated in a processor which performs analog-to-digital conversion and demodulation at the inlet prior to decoding and flexibly routing binary data streams that are TDM encoded, on a frame by frame basis to the corresponding outlet stream on the down link. The processor recodes, modulates, and performs analog-to-digital conversion to constitute the bit stream on the down link.

On the return path, the payload is transparent, as shown by FIG. 3. It can be implemented in a processor. Direct paths shown using dashed lines can be provided in addition to the paths which are subjected to processing. Subsequently, direct connections can be omitted.

By way of example, each incoming signal and each outgoing signal on the return path can have a bandwidth of 125 MHz subdivided into 150 slots of 800 kHz each. The processor 44 performs analog-to-digital conversion and frequency demultiplexing on each of the active incoming signals (signals on the up link). Frequency demultiplexing can be performed on 800 kHz channels. The processor performs routing and distribution of the channels over the appropriate down links by multiplexing the 800 kHz channels and performing digital-to-analog conversion.

Figure 4:
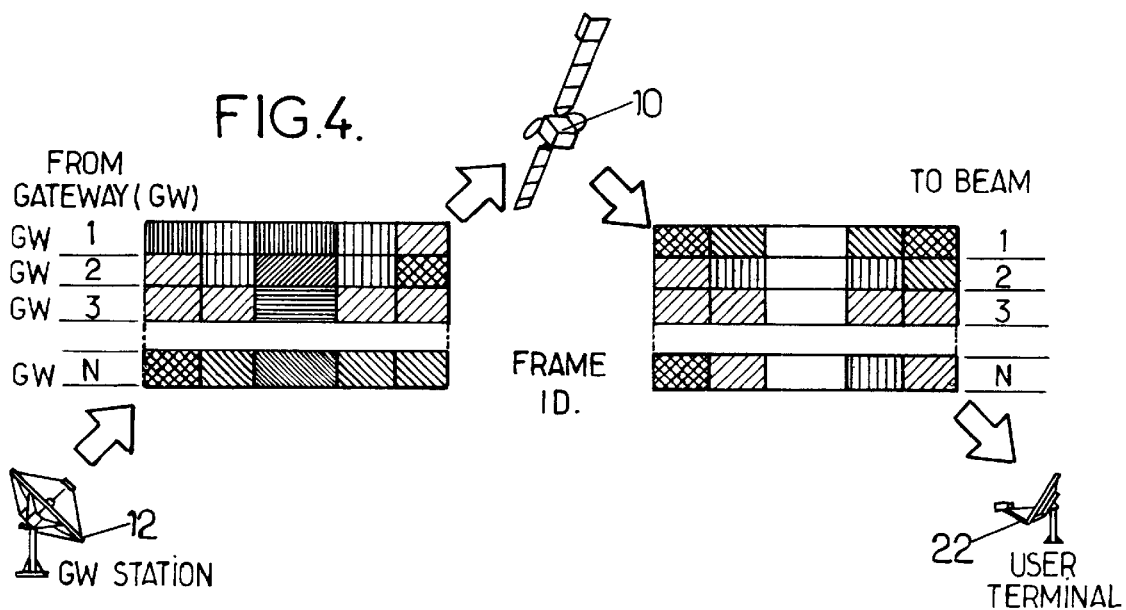
FIG. 4 is a diagram representing the interconnection matrix on board the satellite on the forward path.

FIG. 4 shows an example of routing on the forward path, by switching up link frames using a special interconnection matrix, for 1 to N beams. The frames (sixty-four for example), in each up-link TDM superframe, are sent independently to respective beams of the down path, in compliance with a stored table. The interconnection matrix is determined by the network control center 18 which allocates to each gateway frames on the corresponding transmission beams.

Figure 5:
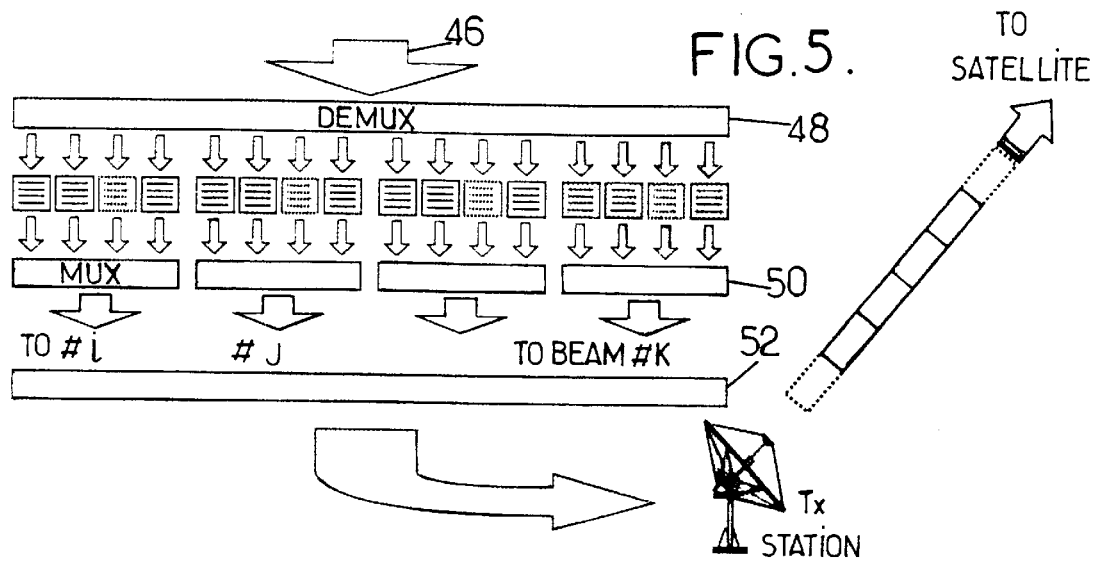
FIG. 5 is a diagram showing how resources are allocated at each gateway.

On the terrestrial segment, the allocation mechanism used by the gateways can be as shown diagrammatically in FIG. 5. Traffic coming from the terrestrial network for transmission to the satellite, represented by arrow 46, is applied to a demultiplexer 48. This separates out traffic cells as a function of destination beam and possibly also as a function of the nature of the service carried. Multiplexers 50 allocated to the various beams perform new multiplexing on a single TDM stream 52 compatible with the is superframe structure that might be imposed by the interconnection matrix.

Figure 6:
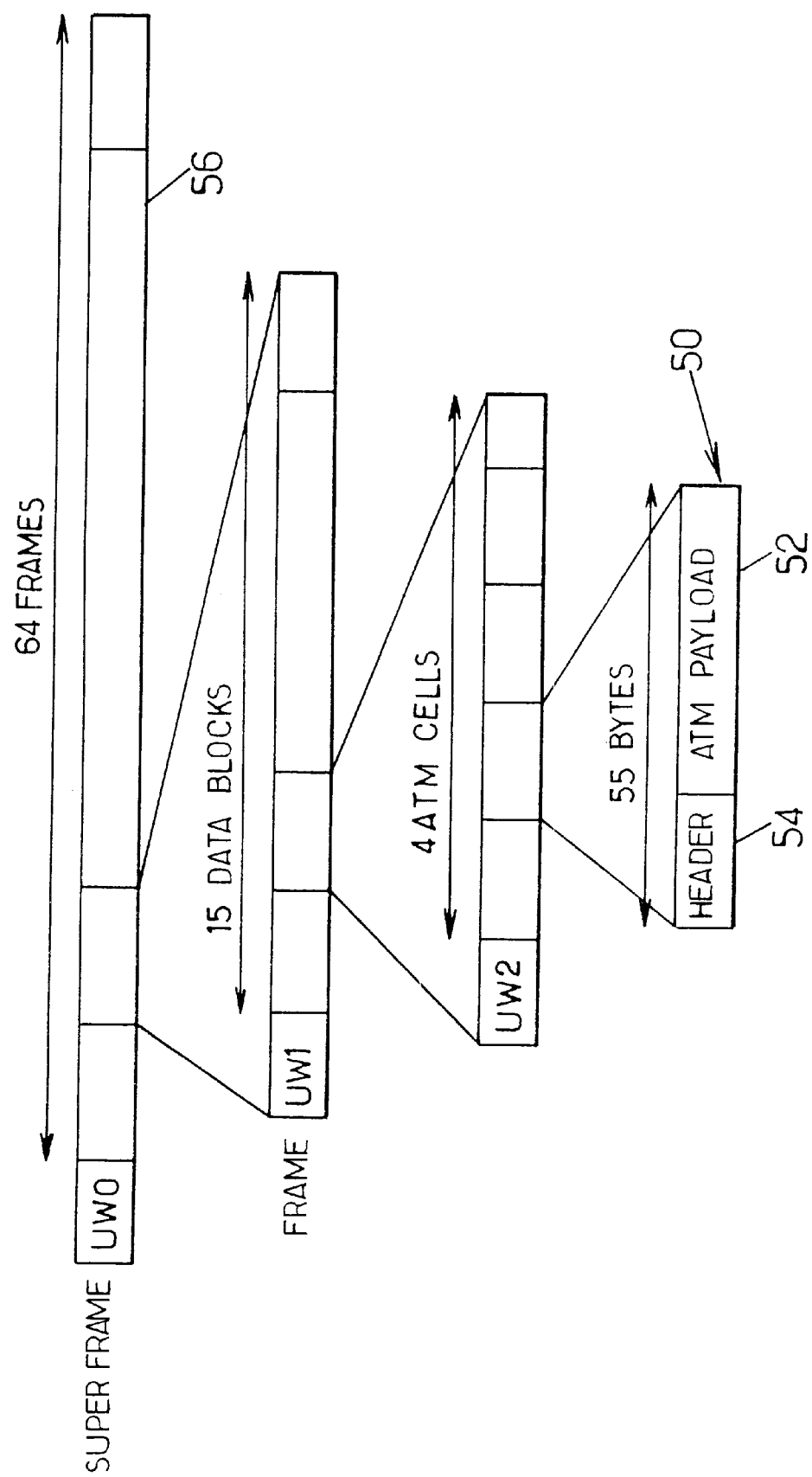
FIG. 6 is a diagram showing one possible structure for the stream of data on the forward path.

Data distribution can be as shown in FIG. 6, using an ATM protocol. Payload data is subdivided into cells 50, each comprising 55 bytes and constituting information 52 and a header 54. Cells are grouped together into blocks of four cells preceded by a header and followed by correcting code. These blocks are in turn grouped together into frames of 15 blocks each, preceded by a header.

Finally, the frames are grouped into superframes 50 each having a header.

On the return path, using an ATM protocol, connectivity is performed by frequency switching performed by the payload, the connectivity matrix being determined by the control center and being stored on board the satellite.

Figure 7:
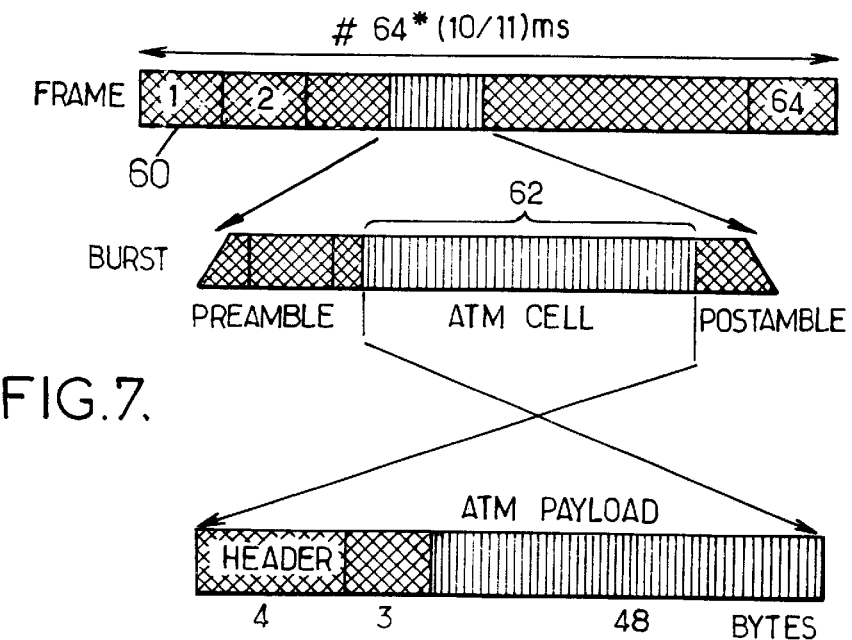
FIG. 7 is a variant of FIG. 6.

Another possible way of distributing data on the return path is shown diagrammatically in FIG. 7. The transmission structure is constituted by frames each comprising sixty-four bursts 60, with this number being selected as being an optimum compromise between access time and a minimum access rate, in particular for traffic and for signaling. Each burst comprises 1000 bits, giving a duration of about 10 ms. Each frame comprises payload information 62, a preamble, and a postamble. Each cell can be constituted by forty-eight data bytes preceded by a 4-byte header and a 3-byte correction code. This structure makes it possible to achieve granularity of one cell per burst.

Such a structure makes half-level convolution encoding possible at burst level and it makes Viterbi decoding with soft decision or with maximum likelihood decision possible. In addition to encoding applied to the cell as a whole, measures are provided for increasing robustness against specific error configurations on satellite communications, in particular the cell loss rate and the error rate. At cell level, greater robustness is by increasing the correction ability of the overall header, by changing the correction from one byte to three bytes. It is possible in particular to use a Reed-Solomon code.

Such apparatus is capable of evolving, specifically when it is desired to increase data rate by increasing the number of cells in a burst.

On the forward path, frame distribution can have a three-level hierarchy, namely: data blocks constituted by four cells and an error correction code; frames constituted by fifteen blocks; and superframes constituted by sixty-four frames. In order to facilitate synchronization, the duration of a burst can be a simple fraction of the duration of a frame on the return path, for, example one-fourth of said duration.

It is desirable for the system to have synchronization means. Access from a terminal is based on frequency distribution and on time distribution. Terminals must consequently operate with a common time reference so as to avoid collisions between cells transmitted by different terminals. Variations in the position of the satellite relative to its set position give rise to variations in propagation times, possibly complicated by the displacements of those user terminals that are mobile.

Figure 8:
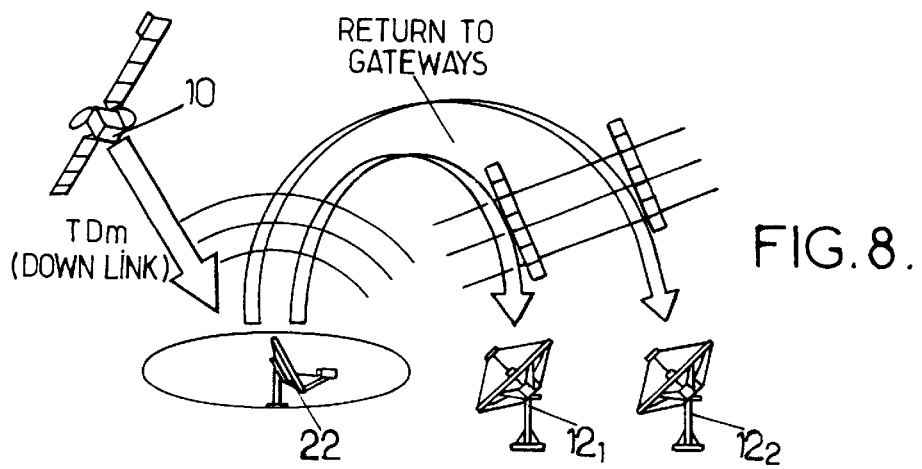
FIG. 8 shows one possible mode of gateway synchronization.

This requires that all of the terminals be synchronized and possibly also all of the gateways that are in a given beam. For this purpose, proposals have been made to use the TDM signal received by the terminals on the down link as a common clock. For each beam, a single gateway $12_1$ (FIG. 8) serves to synchronize all of the terminals and all of the other gateways $12_2$ within the coverage of the beam.

We claim:

1. A telecommunication system having:
   (a) a space segment having a satellite carrying a telecommunication payload including antenna means for forming a plurality of up-link and downlink radio communication beams directed to different locations on the Earth, and
   (b) a terrestrial segment comprising gateways giving access to a terrestrial network and comprising terrestrial terminals,
   wherein said gateways have means for transmission of messages on TDM carriers toward said satellite payload on a respective one of said beams and for reception of messages in F/TDMA mode from said payload on said one of said beams,
   wherein said terrestrial terminals each have means for transmission of messages in F/TDMA mode toward said satellite payload on a respective said beam and for reception of messages in TDM mode from said payload, and
   wherein said telecommunication payload further comprises:
      forward transmission means for communication of messages in TDM mode on a forward path from any one of said gateways to any one of said terrestrial terminals, having a cross connect TDM frame switch unit arranged for regenerating received said messages and routing said messages frame by frame in TDM mode, responsive to addresses of the TDM frames, to outputs each assigned to a down link on one of said radio communication beams,
      return transmission means for communication of messages in F/TDMA mode on a return path from any one of said terrestrial terminals to any one of said gateways, having a transparent frequency cross-connection switch unit arranged for routing said messages to outputs each assigned to a down link on one of said radio communication beams.

2. A system according to claim 1, wherein the routing unit on the return path is non-regenerative and transparent.

3. A system according to claim 1, wherein said routing unit on the return path operates in multiple access transmission mode with carrier frequency division and with, for each carrier, a distribution of each message from the user terminal over time slots of same rank in successive frames.

4. A system according to claim 1, wherein transmission toward user terminals on the forward path are in wide band TDM shared between all user terminals in a same beam.

5. A system according to claim 4, wherein said routing unit on one said forward path has, for each beam, in succession, an amplifier, a bandpass filter, a demodulator and a cross-connect switch and is arranged for directing the frames to the output beams after modulation and amplification.

6. A system according to claim 1, wherein the routing unit on the forward path is arranged to carry out independent switching of the frames on the up link in compliance with an interconnection matrix stored in a table determined by a network control center which allocates frames on the beams to each said gateway.

7. In a telecommunication system having a terrestrial segment with gateways giving access to a terrestrial network and with terrestrial terminals, a satellite carrying a telecommunication payload, said telecommunication payload comprising:
   (a) means for forming a plurality of radio communication beams directed the Earth,
   (b) forward transmission means for relaying communication in TDM mode on a forward path from any one of said gateways to any one of said terrestrial terminals, having:
      first means each for receiving one of said radio communication beams, each for analog-to-digital conversion and each for decoding messages received from one of said gateways in TDM mode via an up-link on said one radio communication beam,
      a cross connect TDM frame switch unit having inputs connected to said first means, arranged for digitally regenerating said messages and routing said messages frame by frame in TDM mode, responsive to addresses of the frames, to outputs each assigned to a down link on one of said radio communication beams, and second means each for digital-to-analog conversion and encoding of messages to be transmitted on a respective one of said radio communication beams in TDM mode, and (c) return transmission means for communication in F/TDMA mode on a return path from any one of said terrestrial terminals to any one of said gateways, having:

third means each for receiving one of said radio communication beams, and each for analog-to-digital conversion of messages received on an up-link from those of said terminals which are located in said one of said radio communication beams assigned to the respective third means, in F/TDMA mode, a transparent frequency cross-connect switch unit having inputs connected to said third means, arranged for routing said messages in F/TDMA mode to outputs each assigned to a down link on a respective one of said radio communication beams, and fourth means each for digital-to-analog conversion and for passing messages to be transmitted in F/TDMA mode on said respective one of said radio communication beams.

8. A satellite according to claim 7, wherein said transparent frequency cross-connection switch unit includes a stored cross-connection matrix downloadable from the Earth.

9. A satellite according to claim 7, wherein said transparent frequency cross-connection switch unit is arranged for frequency demultiplexing of signals received from various of said terminals on the return path.

10. A satellite according to claim 7, wherein said cross-connect TDM frame switch unit and said frequency cross connect switch are implemented in two mutually independent digital processors.

11. A satellite according to claim 7, further having direct connections on the return path by-passing said transparent frequency cross-connect switch.

12. A telecommunication system having:

(a) a space segment having a satellite carrying a telecommunication payload including means for forming a plurality of radio communication beams directed to different locations on the Earth, and (b) a terrestrial segment comprising gateways giving access to a terrestrial network and comprising terrestrial terminals, wherein said telecommunication payload further comprises:

(b1) forward transmission means for communication in TDM mode on a forward path from any one of said gateways to any one of said terrestrial terminals, having:

first means each for receiving one of said radio communication beams, each for analog-to-digital conversion and each for decoding of messages received from one of said gateways in TDM mode via an up-link on said one radio communication beam, a cross connect TDM frame switch unit having inputs connected to said first means, arranged for digitally regenerating said messages and routing said messages frame by frame in TDM mode, responsive to addresses of the frames, to outputs each assigned to a down link on one of said radio communication beams, and second means each for digital-to-analog conversion and encoding of messages received on one of said outputs and to be transmitted on a respective one of said radio communication beams in TDM mode and delivery said messages to said means for forming said beams, (b2) return transmission means for communication in F/TDMA mode on a return path from any one of said terrestrial terminals to any one of said gateways, having:

third means each for receiving a respective one of said plurality of said radio communication beams and each for analog-to-digital conversion of messages received on an up-link from those of said terminals which are located in the respective radio communication beam, in F/TDMA mode via said up-link on the respective radio communication beam, a transparent frequency cross-connection switch unit having inputs connected to said third means, arranged for routing said messages in F/TDMA mode to outputs each assigned to a down link on another said radio communication beam, and fourth means each for digital-to-analog conversion and of messages to be transmitted in F/TDMA mode on said another one of said radio communication beams.

* * * * *